(12) United States Patent
Smith et al.

(10) Patent No.: US 6,247,712 B1
(45) Date of Patent: *Jun. 19, 2001

(54) TRAILING AXLE ASSEMBLY

(76) Inventors: Fred P. Smith, 228 S. Scenic Dr., Alpine, UT (US) 84004; Jack Mitchell, P.O. Box 183, Kamas, UT (US) 84036

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/893,600

(22) Filed: Jul. 14, 1997

(51) Int. Cl.[7] .............................. B62D 61/12; B60G 9/02
(52) U.S. Cl. ..................................... 280/86.5; 280/124.16; 180/209; 180/24.02
(58) Field of Search ........................... 280/86.5, 124.116, 280/124.157, 43.18, 43.17; 180/209, 24.02; 298/23 R

(56) References Cited

U.S. PATENT DOCUMENTS

| | | |
|---|---|---|
| 3,112,100 | 11/1963 | Prichard . |
| 3,191,961 | 6/1965 | Brennan et al. . |
| 3,271,077 | 9/1966 | Timmer et al. . |
| 3,371,543 | 3/1968 | Jackson et al. . |
| 3,838,885 | 10/1974 | Brennan et al. . |
| 3,895,818 | 7/1975 | Fearon . |
| 3,912,293 * | 10/1975 | Harbers .............................. 280/150.5 |
| 4,063,779 | 12/1977 | Martin et al. . |
| 4,705,133 * | 11/1987 | Christenson et al. ................ 280/86.5 |
| 4,762,421 * | 8/1988 | Christenson et al. ................ 280/86.5 |
| 4,783,096 * | 11/1988 | Ramsey et al. ...................... 280/86.5 |
| 4,848,783 * | 7/1989 | Christenson et al. ................ 280/86.5 |
| 4,940,287 | 7/1990 | Ritchie . |
| 5,018,593 * | 5/1991 | Hermann ............................... 280/86.5 |
| 5,018,755 * | 5/1991 | McNeilus et al. .................... 280/86.5 |
| 5,149,126 * | 9/1992 | Brennan ............................... 280/86.5 |
| 5,498,021 * | 3/1996 | Christenson ......................... 280/86.5 |
| 5,516,135 * | 5/1996 | Christenson ......................... 280/86.5 |
| 5,540,454 * | 7/1996 | VanDenberg et al. .............. 280/86.5 |
| 5,549,322 * | 8/1996 | Hauri .................................. 280/86.5 |
| 5,597,174 * | 1/1997 | Christenson et al. ............... 280/86.5 |
| 5,713,424 * | 2/1998 | Christenson ......................... 280/86.5 |
| 5,823,629 * | 10/1998 | Smith et al. ......................... 180/209 |
| B1 4,492,389 * | 6/1987 | Wyatt et al. ......................... 280/86.5 |

* cited by examiner

Primary Examiner—Lanna Mai
Assistant Examiner—Jeffrey Restifo

(57) ABSTRACT

A vehicle comprising a body having a front end and a rear end, front wheels carried by a front axle mounted to the body proximate the front end of the vehicle, rear wheels carried by a rear axle mounted to the body proximate the rear end of the vehicle, a cargo body mounted to the body for carrying a load, a framework having an inner end pivotally mounted to the rear end of the vehicle and having an outer end, wheels mounted for rotation to a trailing axle, the trailing axle mounted to the outer end of the framework for transverse pivotal movement relative the cargo body, the trailing axle movable between an extended orientation wherein the trailing axle is located generally outboard of the outer end of the framework and a retracted orientation wherein the trailing axle is located generally inboard of the outer end of the framework, and a pair of lifting arms for moving the framework relative the cargo body of the vehicle from an operative position wherein the trailing axle is positionable in the extended orientation with the wheels thereof for disposition on the road maximizing the overall length of the vehicle ascending pivotal traverse to a inoperative position wherein the trailing axle is positionable in the retracted orientation rearward of the cargo body, and the inoperative position descending pivotal traverse to the operative position.

33 Claims, 8 Drawing Sheets

TRAILING AXLE ASSEMBLY

BACKGROUND OF THE INVENTION

1. Field of the Invention

This invention relates generally to the field of weight distribution devices.

More particularly, this invention relates to weight distribution devices for use in combination with vehicles.

In a further and more specific aspect, the instant invention relates to a trailing axle assembly for use with vehicles of a type operative for carrying a load.

2. Prior Art

For many years, trucks have been used to transport loads. Dump trucks, refuse trucks and many other types of trucks generally include a cargo body carried by a truck frame. A tailgate may be inclined against the rear end of the cargo body. The tailgate may be movable between a closed and open position. In the closed position, the tailgate and the cargo body define a chamber within which a load may be placed. In the open position, the tailgate opens at the rear end of the truck to allow removal of the load from the cargo body. For dump trucks, the front of the cargo body may be tilted upward at one end of the frame to expedite dumping of the load. The tilting allows gravity to stimulate load removal from the rear end of the cargo body. Alternatively, an ejector panel or moving floor may be used to expedite the removal of the load from the cargo body.

One of the most important agendas of the driver of refuse collection vehicles and dump trucks and other similar vehicles of the foregoing variety is to always carry the maximum load possible. The problem truckers face is that governmental restrictions exist on allowable maximum loads. Load limits have been set to deter damage to roads and bridges caused by excessive loads. Governmental regulations require specific maximum loads for trucks based on the horizontal distance between the front and rear axles of the truck. It is of special interest that this maximum load imposed by government restrictions may be increased with respect to increases in the distance between front and rear axles. It is also of interest that governmental regulations also limit the amount of load that a single axle may carry. The front axles of a truck are generally lightly loaded. By adding a trailing axle, more load can be transferred to these forward axles allowing them to be loaded nearly to their maximum limits.

Trailing axle assemblies have been attached to the rear ends of truck bodies or the rear end of truck frames to increase the legal load capacity of the truck. A trailing axle assembly normally includes an axle at the rear end of the trailing axle assembly and having wheels mounted at either end. There are two extreme positions for the trailing axle. One position is at rest on the ground or road. This effectively increases the overall length from the forward-most axle of the vehicle to the rearward-most axle of the vehicle, i.e., the trailing axle. By distributing the total weight of the load over a longer distance between the front axle and the trailing axle, the allowable load that the dump truck can carry is increased. Therefore, the dump truck can travel on the road and over bridges with an increased load without occasioning damage to roads and bridges.

Regarding dump trucks, the cargo body may be pivoted about the rear end of the frame so that the front end is raised in relation to the rear end of the frame, of which remains in place. The tailgate opens the cargo body of the truck at its rear end. With the tailgate open, gravity acts on the load within the cargo body of the dump truck pulling it towards the ground or into one of many different types of equipment. Preferably, before the tailgate is opened and the cargo body raised, the trailing axle assembly is raised. Raising the trailing axle prevents the load from spreading over part of the trailing axle as it falls out of the cargo body to the ground. Raising the trailing axle also prevents the trailing axle from having to ride over the dumped load which would induce unnecessary stresses on the trailing axle. Raising the trailing axle also allows the load to be dumped into other equipment that must be positioned adjacent to the vehicle.

In order to have the maximum effect for increasing the allowable load, it is desirable for the trailing axle to be a certain distance behind the truck. If the pivot point for the trailing axle is forward of the rear of the truck, the trailing axle when rotated to an upright position would be above the maximum height allowed by government regulations. In this situation, the height must be reduced by some method. There are several disadvantages to prior art trailing axle designs of this variety. In an effort to maintain the legal height of the dump truck and the trailing axle while in the raised position, the prior art has provided hydraulic cylinders and complicated valving and linkage mechanisms to pivot the trailing axle up and over the cargo body of the vehicle. The purpose of the cylinders, valving and linkage is to lower the overall height of the raised trailing axle assembly to conform with government standards. As a consequence, the first disadvantage of the forward pivot feature of the prior art is that the use of cylinders, valving and linkage mechanisms to reduce the height is very costly, complicated and prone to mechanical failure.

A second disadvantage of the prior art forward pivot feature of trailing axle assemblies is the use of lift cylinders for the suspension of the trailing axle. The lift cylinders are designed to absorb shock from bumps and dips in the road as the vehicle is traveling on the road. For example, as the vehicle goes over a bump, the wheels and trailing axle cause the lift cylinders to retract. As the wheels and trailing axle return to the ground, the lift cylinders extend back to their resting position. Thus, the lift cylinders, acting as the suspension system, are required to perform many cycles of movement. This causes excessive and undesired wear on the lift cylinders. The cylinders must also have an accumulator built into them in order to react fast enough to the road bumps and also to return the lift cylinders to their original position after going over a bump, thus dramatically increasing the cost of the lift cylinders.

A further disadvantage of the prior art of the foregoing prior art trailing axle assemblies is that in the stowed position, the trailing axle is over the cargo body which can impede filling the cargo body. Furthermore, the trailing axle of the prior art trailing axle assemblies must be mounted on a toggle to be able to adjust to lateral ground differences without putting undo stress on the trailing axle assembly. This adds considerable expense and complexity to the trailing axle assembly. Yet a further disadvantage of the prior art is that the accumulator must be mounted close to the lift cylinders for them to be fast acting, and a large volume of gas is required in the accumulator so that as the lift cylinders compress the forces and stresses in the trailing axle do not increase too much.

Another method used in the prior art is to have the pivot point for the trailing axle substantially rearward of the rear of the truck and attached to the truck frame. When the trailing axle assembly is attached to the rear end of the truck frame, the height of the trailing axle assembly in the raised position can exceed government regulations. To prevent government regulation violation, one solution has been to shorten the length of the trailing axle assembly. The disadvantage to this practice is that by shortening the length of the trailing axle assembly the maximum increase in the legal load allowances for the truck is not possible. Should the pivot for the trailing axle be moved far enough to the rear of the truck body, the trailing axle when rotated to an upright position would be below the maximum height allowed by government regulations. In this regard, the pivot point becomes an unsafe appendage that does not comply to government regulations and hinders the flow of the load from the cargo body when the front end has been pivoted upwards and the tailgate opened to release the load from the cargo body. This occurs because the trailing axle assembly is connected to the center of the chassis frame between opposite lateral sides of the frame. Therefore, even when the trailing axle assembly is raised, the design still tends to block the release of the dump load from the cargo body.

Another disadvantage of the foregoing prior art apparatus is that the appendages to the trailing axle assemblies also make it difficult or even impossible to dump the load into some types of paving machines. Furthermore, extraordinary measures must sometimes be taken in the design of the tailgate in order to have it not interfere with the trailing axle arm(s) in the raised position. Also, because the trailing axle is mounted directly to the truck frame, stresses in the truck frame increase dramatically. This moment thus added to the truck frame develops additional stresses in the truck frame at the attachment point and elsewhere and can cause failure of the entire trailing axle assembly.

All of the prior art trailing axles have required a "live" power hydraulic system. This has been accomplished on dump trucks, for example, by adding a completely separate hydraulic system to operate the trailing axle, even though the truck already had hydraulic power available from the power take off. This "live" power was deemed necessary because of the complicated valving required to operate the axle and to compensate for cylinder leaks. Many trucks which would use a trailing axle assembly do not normally have live power, so this is an extra expense to add and also adds to the complexity and thus the maintenance of the trailing axle.

The suspension inadequacies of the prior art is another disadvantage of the prior art trailing axle assemblies. This happens because of the inability of the trailing axle assembly to respond smoothly and efficiently to bumps and dips in the road while the wheels of the trailing axle assembly are on the road and the vehicle is traveling down the road. This affects the smoothness and steadiness in the ride of the vehicle while on the road. The inability to respond effectively to road inconsistencies also affects the life of the trailing axle assembly. As the vehicle travels over a dip or bump in the road, forces and stresses are significantly increased, causing bending and undesired changes in the trailing axle assembly.

Another disadvantage of the prior art is the forces that are generated on the trailing axle in the stowed position as the truck goes over bumps and dips. All of the prior art of forward pivot style stow the trailing axle in such a way that the acceleration-deceleration forces (g-forces) of the axle, tires and supporting structure must be taken into the trailing axle arms through some sort of stop in the linkage. As these g-forces can be quite high, the stresses induced in the linkage are also quite high and therefore prone to failure or must be massive and thus expensive.

Yet Another disadvantage of the prior art is that when the lift cylinders are pushing the trailing axle down onto the ground, the lift cylinders put a moment in the arms which puts tension in the top and compression in the bottom. In addition, the lift cylinders put tension in the whole arm as it pushes. Therefore, the two tensions in top of the arm are additive and the tension and compression in the bottom of the arm are subtractive. This requires a much larger and heavier arm to take the additive tensile stresses.

It would be highly advantageous, therefore, to remedy the foregoing and other deficiencies inherent in the prior art.

Accordingly, it is an object of the present invention to provide a new and improved trailing axle assembly.

Another object of the present invention is to provide a trailing axle assembly that is safe and highly efficient.

And another object of the present invention is to provide a trailing axle assembly that is easy to construct.

Still another object of the present invention is to provide a trailing axle assembly that is easy to use.

Yet another object of the instant invention is to provide a trailing axle assembly that is inexpensive.

Yet still another object of the instant invention is to provide a trailing axle assembly that incorporates a spring suspension system to absorb the shock of bumps and dips.

And a further object of the invention is to provide a trailing axle assembly that does not impede the flow of material into the body of a dump truck when the trailing axle assembly is in a stowed configuration.

Still a further object of the immediate invention is to provide a trailing axle assembly that exerts a low degree of stress upon the frame of a vehicle.

Yet a further object of the invention is to provide a trailing axle assembly for maximizing the distance between the front axle of a truck and the rear axle of the truck.

And still a further object of the invention is the provision of maximizing the amount of a load a dump truck may carry.

And yet still a further object of the invention is the provision of providing an actuating element operative for maintaining a trailing axle assembly in an operative position.

Another object of the present invention is the provision of minimizing the amount of stress applied to a trailing axle assembly during operation.

SUMMARY OF THE INVENTION

Briefly, to achieve the desired objects of the instant invention in accordance with a preferred embodiment thereof, provided is a vehicle of a type having a body with a front end and a rear end, front wheels carried by a front axle mounted to the body proximate the front end of the vehicle, rear wheels carried by a rear axle mounted to the body proximate the rear end of the vehicle and a cargo body mounted to the body for carrying a load. Further included is a trailing axle assembly comprising a framework having an inner end pivotally mounted to the rear end of the vehicle and having an outer end, wheels mounted for rotation to a trailing axle, the trailing axle mounted to the outer end of the framework for transverse pivotal movement relative the cargo body. The trailing axle is movable between an extended orientation wherein the trailing axle is located generally outboard of the outer end of the framework and a retracted orientation wherein the trailing axle is located generally inboard of the outer end of the framework. Additionally provided is means for moving the framework relative the cargo body of the vehicle from an operative position wherein the trailing axle is positionable in the extended orientation with the wheels thereof for disposition on the road maximizing the overall length of the vehicle ascending pivotal traverse to a inoperative position wherein the trailing axle is positionable in the retracted orientation rearward of the cargo body, and the inoperative position descending pivotal traverse to the operative position.

BRIEF DESCRIPTION OF THE DRAWINGS

The foregoing and further and more specific objects and advantages of the instant invention will become readily apparent to those skilled in the art from the following detailed description of preferred embodiments thereof taken in conjunction with the drawings in which.

DETAILED DESCRIPTION OF THE PREFERRED EMBODIMENT

Figure 1:
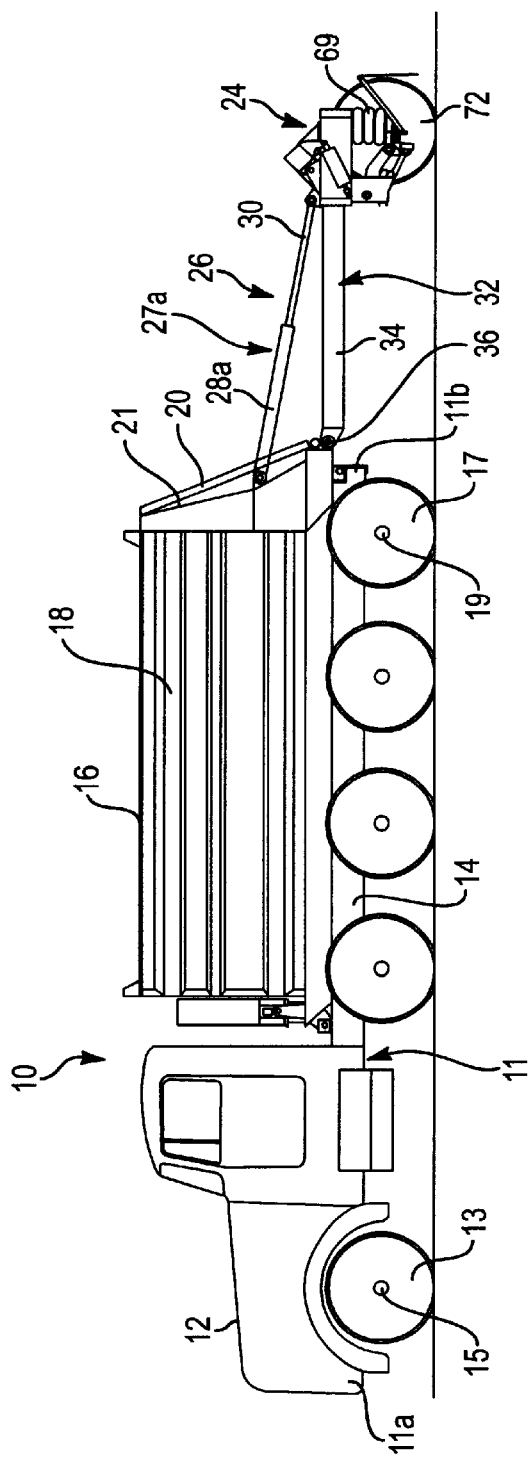
FIG. 1 illustrates a side elevational view of a vehicle of a type having a body and a cargo body mounted to the body for carrying a load, the vehicle further including a trailing axle assembly mounted at a rear end of the vehicle and shown in an operative or lowered position with wheels of the trailing axle assembly positioned upon the ground, in accordance with a preferred embodiment of the present invention.

Turning now to the drawings, in which like reference characters indicate corresponding elements throughout the several views, attention is first directed to FIG. 1 which illustrates a vehicle 10 of a type having a body 11 with a front end 11A, a rear end 11B, front wheels 13 carried by a front axle 15 mounted to body 11 proximate front end 11A and rear wheels 17 carried by a rear axle 19 mounted to the body 11 proximate the rear end 11B of vehicle 10, a cab 12, a frame 14 and a cargo body 16 mounted to the body 11 for carrying a load. Cargo body 16 includes a lower panel (not shown), side panels 18 and a forward panel (not shown) cooperating together to bound a chamber (not shown) within which a load may be carried. Side panels 18 define the lateral extremities of vehicle 10. A tailgate 20 may be provided at the rear end 11B of vehicle 10 to act as a closure for cargo body 16. The tailgate 20 may be movable between a closed position and an open position. In the closed position, a load in the cargo body 16 is able to exit therefrom through the rear end 11B of the vehicle 10. The flow of the load from the cargo body 16 is expedited by raising the forward end of the cargo body 16 while the cargo body 16 pivots about the rear end 11B. The forward end is raised upwardly using a telescopic dump cylinder displayed at 22 in FIG. 9, the fulcrum being near the rear end 11B of vehicle 10. The construction of vehicle 10 is typical of dump-style trucks well known to those having regard toward the relevant art. Furthermore, although vehicle 10 has been described consistent with conventional dump-style trucks, other similar vehicles such as concrete trucks and like vehicles having a body and a cargo body carried by the body and operative for carrying a load are also intended to be included herein.

Figure 2:
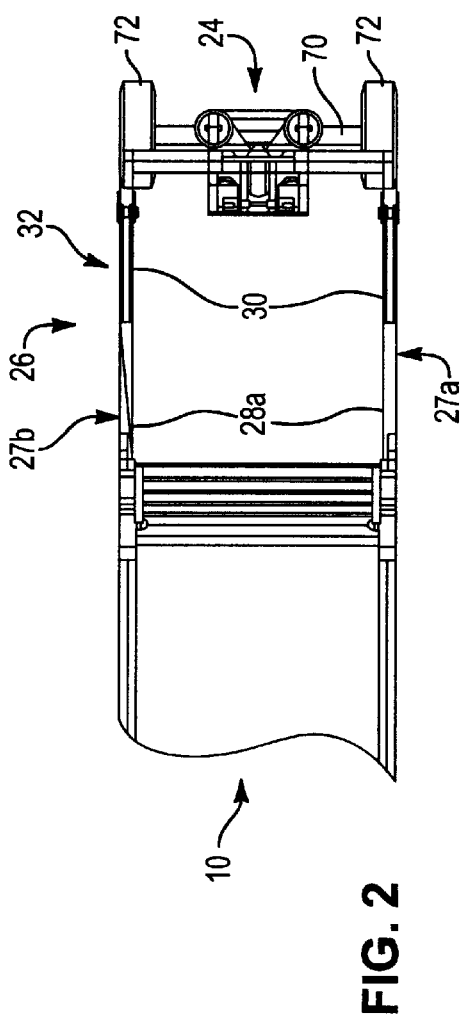
FIG. 2 is a top plan fragmented view of the vehicle of FIG. 1 with the trailing axle assembly shown in the lowered position.
Figure 3:
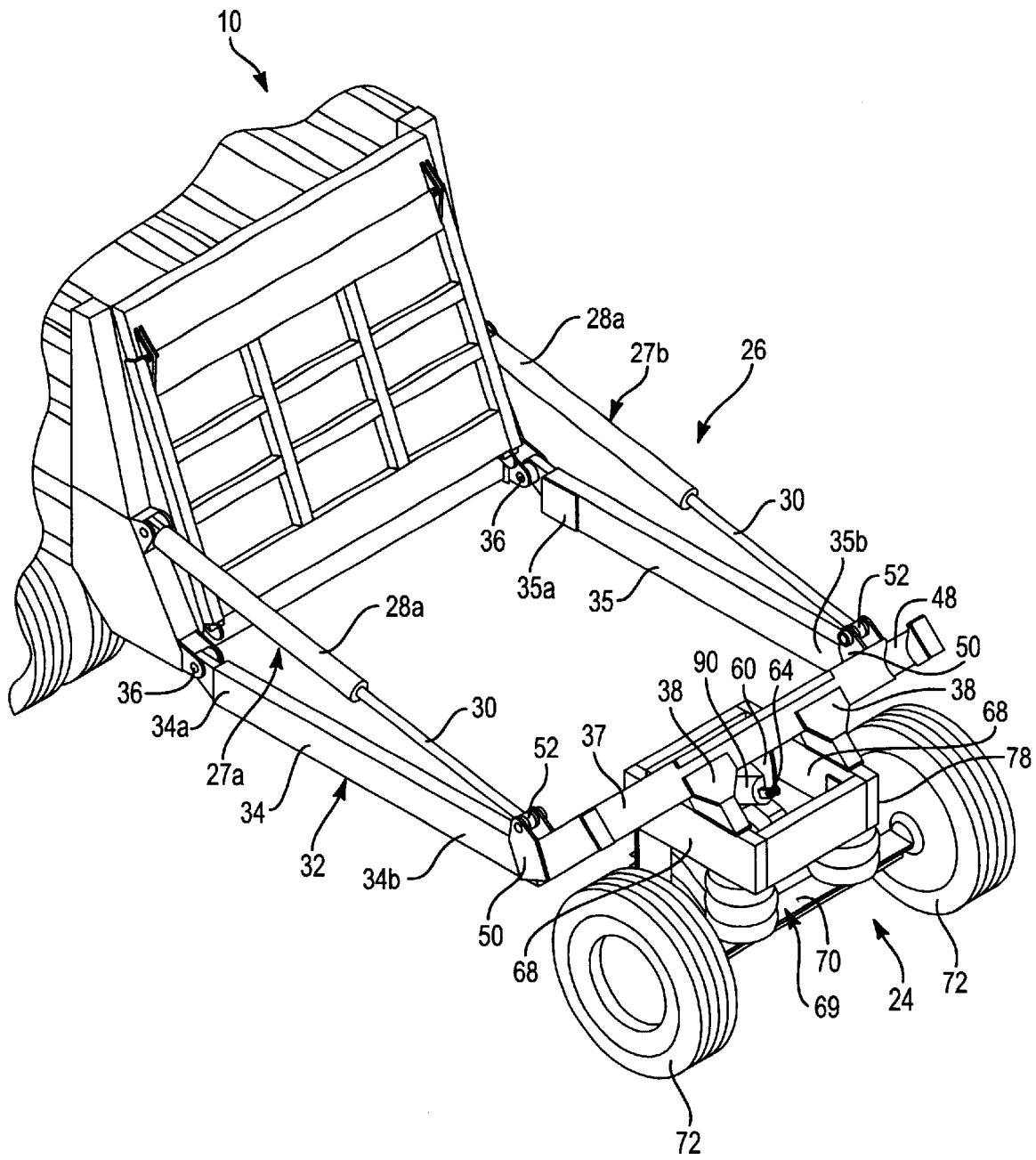
FIG. 3 is a fragmented perspective view of the vehicle of FIG. 1 with the trailing axle assembly shown in the lowered position.

With continuing reference to FIG. 1 and additional reference to FIGS. 2–3, a trailing axle assembly 24 is couplable to the rear end 11B of vehicle 10 in accordance with a preferred embodiment thereof. In particular, trailing axle assembly is preferably couplable to the side panels 18 at the rear end 11B of vehicle 10. The trailing axle assembly 24 includes a hydraulic drive generally indicated at 26. The hydraulic drive 26 may include first and second hydraulic lifts 27A and 27B each including lift cylinders 28A pivotally couplable to the side panels 18 at the rear end 11B of vehicle 10. The hydraulic drive 26 also includes cylinder rods 30 positioned within the lift cylinders 28A at one end and attached at the other end to a framework 32 of trailing axle assembly 24. Framework 32 includes a pair lift arms 34 and 35 disposed in spaced-apart and generally parallel relation, each having inner ends 34A and 34B, respectively, pivotally mountable to rear end 11B of vehicle, preferably at side panels 18 as shown, and extending outwardly therefrom and terminating with outer ends 34B and 35B interconnected by virtue of a support member 37 transverse to cargo body 16 of vehicle 10. Inner ends 34A and 35B are each preferably attached to rear end 11B of vehicle at side panels 18 by virtue of a pivot pin 36, although other mechanisms for pivotal mount may be used without departing from the nature and scope of the present invention as herein specifically described.

The attachment of lift arms 34 and 35 and the lift cylinders 28A to the side panels 18 of the vehicle 10 rather than to the frame 14 offers certain advantages. The side panels 18 have a large distance between the front and rear of the vehicle 10. Because of this, the couple that is put into the side panels 18 by the hydraulic drive 26 and the lift arms 34 and 35 is taken out into the frame 14 as a couple through the side panels 18 at the front and back of the cargo body 16. Since the distance is large between the front and rear of the side panels 18, the force required for the couple is as a result small. As a result, the frame 14 does not become bent or bowed away from the cargo body 16 when the hydraulic drive 26 and the lift arms 34 are pivoted between an inoperative or stowed configuration and an operative or lowered configuration, further details of which will be discussed shortly.

With continuing reference to FIG. 3, the lift cylinders 28A are filled with hydraulic fluid. The lift cylinders 28A are pivotally attached to lift arms 34 and 35, respectively, by two pairs of brackets 50 and pins 52 which hold the cylinder rods 30 and allow the lift arms 34 and 35 to pivot about brackets 50. These brackets 50 also cover and add strength to the splice in the lift arms 34 where they turn upward.

Figure 6:
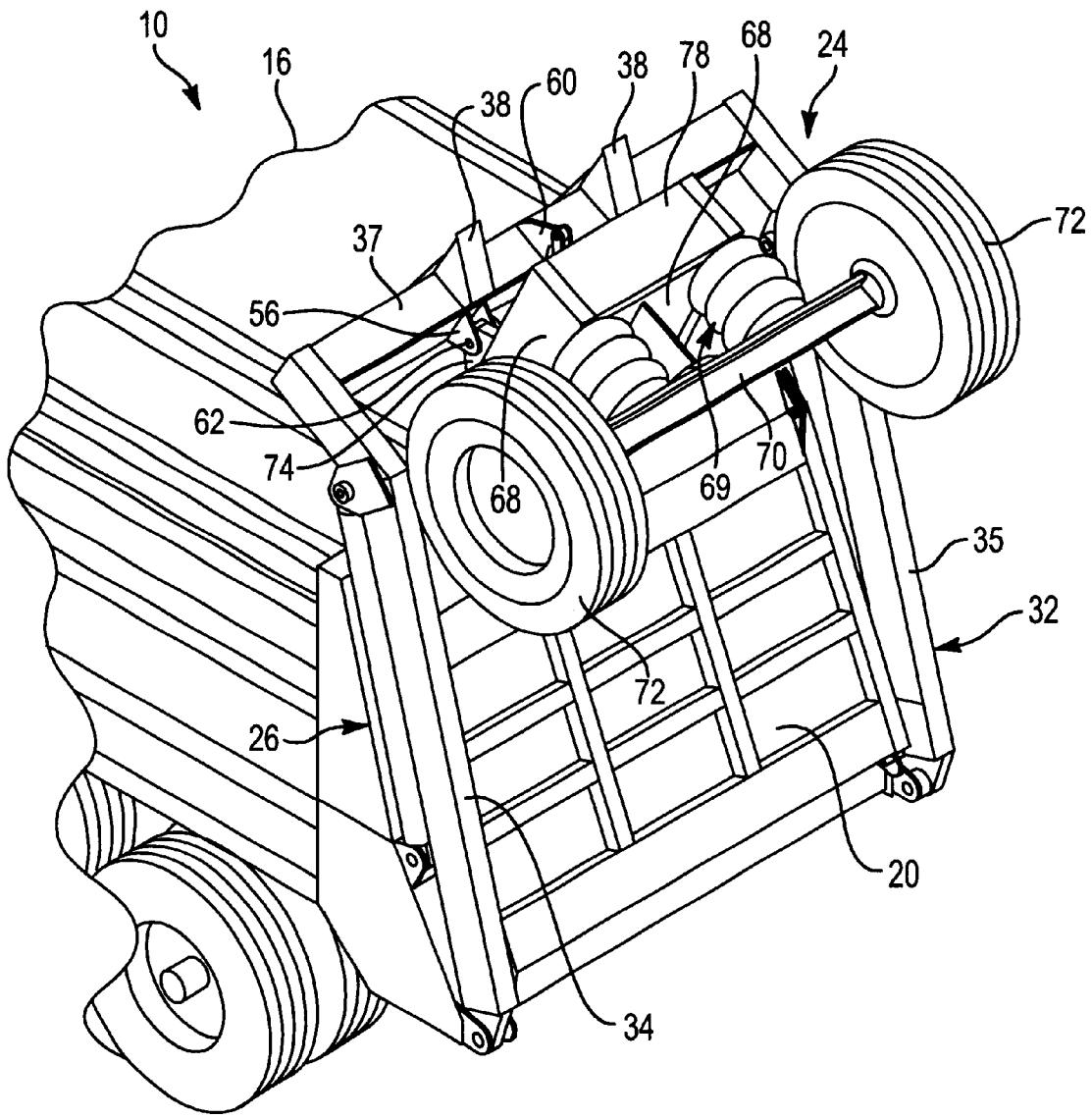
FIG. 6 is a fragmented perspective view of the vehicle of FIG. 1 with the trailing axle assembly shown in a stowed position.

Referring to FIG. 6, two pairs of brackets 56 are attached to support member 37 in spaced apart relation intermediate outer ends 34B and 35B of lift arms 34 and 35. Disposed in the area between the brackets 56 is another bracket 60. A pin 62 (only one shown) attached to each of the brackets 56 supports a pivot bearing tube 66 of a support assembly generally designated at 78. More specifically, the pivot bearing tube 66 is attached to a swivel ear 74. The swivel ear 74 attaches to side members 68 which make up the sides of the support assembly 78. The side members 68 are attached at their lower ends to an air bag or spring suspension system, generally indicated at 69, which is in turn attached to a trailing axle 70. Wheels 72 are suitably disposed on the trailing axle 70 for rotation. The support assembly 78 pivots transversely about pin 62 relative cargo body 16 and support member 37. The support assembly 78 may pivot pendulum-like when raising the trailing axle assembly 24 from an operating to the stow positions. This rotation continues until the trailing axle wheels 72 come to rest against the lift arms 34.

Figure 4A:
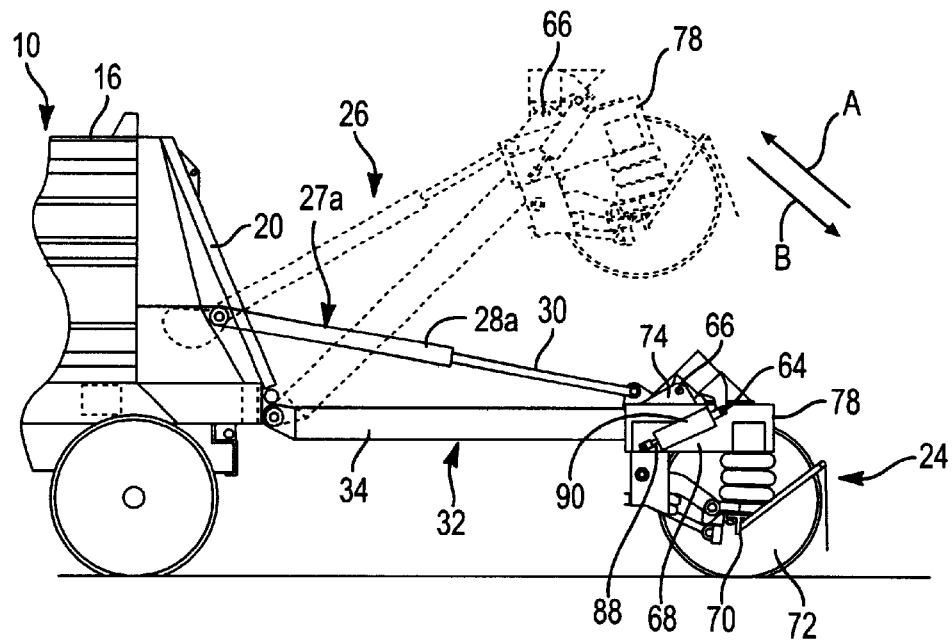
FIG. 4A is a fragmented side elevational view of the vehicle of FIG. 1 further showing, in solid lines, the trailing axle assembly in the lowered position and, in broken lines, the trailing axle assembly in a raised position.

As shown in FIG. 4A, an actuating element or air cylinder 90 is pivotally attached to bracket 60 (shown only in FIG. 6) at one end by pin 64 and pivotally attached to the front of the support assembly 78. The support assembly 78 pivots away from vehicle 10 in an extended orientation of trailing axle 70 when the air cylinder 90 is extended or alternately will pivot toward vehicle 10 in a retracted orientation of the trailing axle 70 with a spring offset toward the rear. This pivotal movement of support assembly 78 to the extended orientation of trailing axle 70 continues until the side members 68 contact stops 38 (FIG. 3) coupled to support member 37 and extending rearwardly therefrom. Since air cylinder 90 has extra stroke in both directions and the stops 38 are directly over the trailing axle 70, all of the force put down on the trailing axle 70 goes directly into the stops 38 and none goes into the pivot pin 62 or air cylinder 90. In the situation where braking occurs, all of the force is taken out of the stops 38 and pivot pins 62. From the foregoing discussion, it will be understood that air cylinder 90 operates to urge support assembly 78 to the extended orientation and maintain support assembly 78 in the extended orientation when the trailing axle assembly is disposed in the operative position.

By virtue of hydraulic drive assembly 26 or other suitable motive mechanism, trailing axle assembly 24 is movable from an operative position an operative position (shown in FIGS. 1–4A and 5A) wherein the framework 32 is disposed in a generally horizontal configuration rearward of vehicle 10 with the trailing axle 70 being positionable in the extended orientation with the wheels 72 thereof for disposition on the road maximizing the overall length of the vehicle 10 ascending pivotal traverse in the direction indicated by the arrowed line A in FIG. 4A to a inoperative position (shown in FIGS. 4B, 6 and 9) wherein the framework 32 is disposed in a generally vertical orientation against the rear end 11B of vehicle with the trailing axle 70 being positionable in the retracted orientation rearward of the cargo body 16, and the inoperative position descending pivotal traverse in the direction indicated by the arrowed line B in FIG. 4A to the operative position.

With continuing reference to FIG. 4A, the operative of the trailing axle 70 is set such that the wheels 72 are on the ground. In this position, the horizontal distance between the front axle 15, the forward-most axle of vehicle 10, and the trailing axle 70, the rearward-most axle of vehicle 10, is maximized relative to the distance between the front axle 15 and the rear axle 19 on the vehicle 10. Because of this significant increase in the horizontal distance, when the wheels 72 contact the ground, the legal load carried in the cargo body 16 can be considerably increased while vehicle 10 is traveling along a road.

The trailing axle 70 and the wheels 72 are shown in a transitional position in FIGS. 4A (dotted lines) and 5B intermediate the operative position and the inoperative or stowed position. This position occurs as the hydraulic drive 26 raises the lift arms 34 and 35 from the operative position of the trailing axle 70. The cylinder rod 30 retracts into the lift cylinders 28A to raise the hydraulic drive 26 and lift arms 34 and 35. As the hydraulic drive 26 and lift arms 34 and 35 are raised, the air cylinder 90 pivots about the bearing pivot pin 64. The support assembly 78 pivots transverse relative support member 37 and cargo body 16 by the force of gravity until the trailing axle wheels 72 rest against the lift arms 34 and 35 when the lift arms 34 and 35 are disposed in the vertical orientation. While the support assembly 78 pivots, the air cylinder rod 88 extends from the air cylinder 90. The air cylinder 90 provides no force during this operation and is in float. The transverse pivotal movement of the support assembly 78 moves the trailing axle 70 and wheels 72 from the extended position to the retracted position to keep them below the government restricted maximum heights. These governmental restrictions are partially imposed to provide free passage of vehicles through underpasses of bridges, traffic lights, etc., when the vehicles are traveling with a light load or no load and with the trailing axle assembly raised to its stowed position.

Figure 4B:
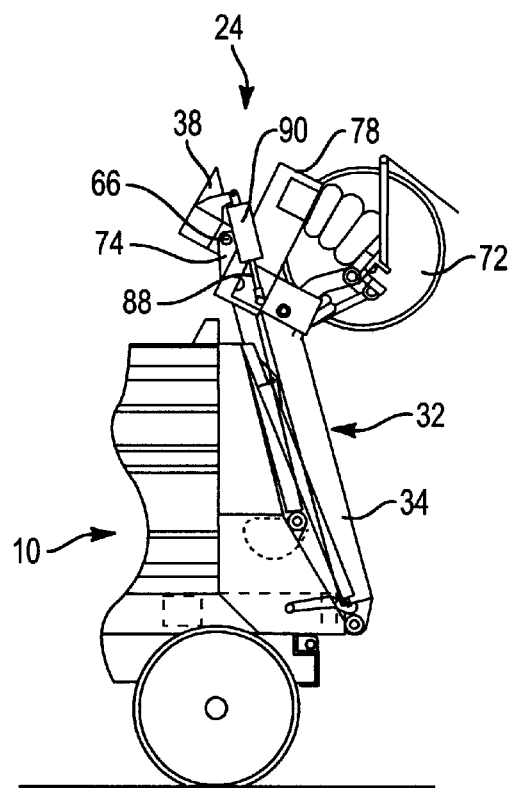
FIG. 4B is a fragmented side elevational view of the vehicle of FIG. 1 further showing the trailing axle assembly in an inoperative, stowed or raised position.
Figure 5A:
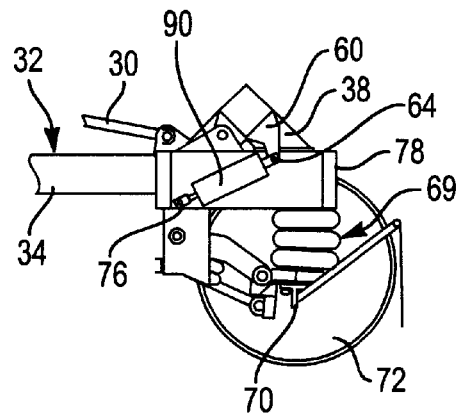
FIG. 5A is an enlarged fragmentary side elevational view of the trailing axle assembly of FIG. 1 shown as it would appear in the lowered position.
Figure 5B:
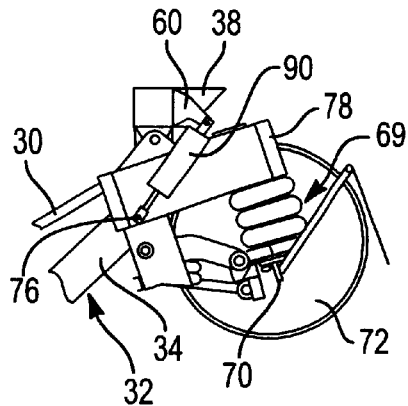
FIG. 5B is an enlarged fragmentary side elevational view of the trailing axle assembly very similar to the view of FIG. 5A, the trailing axle assembly shown as it would appear in an elevated position from the lowered position.
Figure 5C:
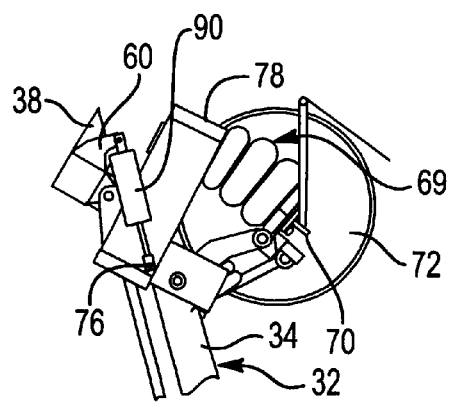
FIG. 5C is an enlarged fragmentary side elevational view of the trailing axle assembly very similar to the view of FIG. 5B, the trailing axle assembly shown as it would appear in a stowed or raised position.
Figure 9:
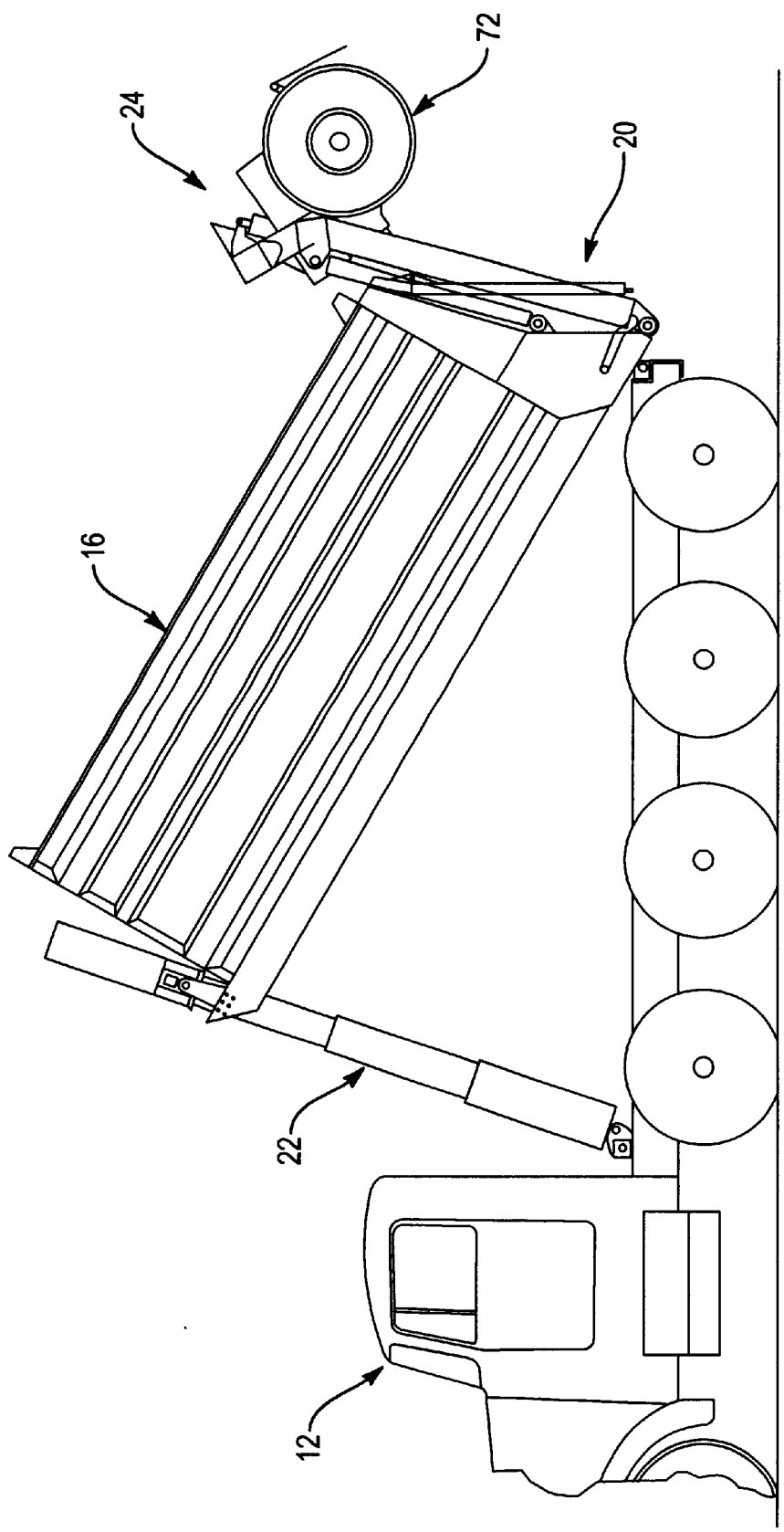
FIG. 9 is a side elevational view of the vehicle of FIG. 1 with the cargo body shown in a raised configuration and the trailing axle assembly shown in a stowed position.

When the vehicle is dumping its load, the trailing axle 70 and the wheels 72 should be in the stowed position shown in FIGS. 4B and 5C. This is the final or stowed position of the trailing axle assembly 24 in which the trailing axle 70 is raised above the vehicle 10. When the trailing axle 70 is raised above the vehicle 10, the tailgate 20 can be opened to provide for the dumping of the load in the cargo body 16 as shown in FIG. 9. As will be seen in FIG. 6, when the trailing axle assembly 24 is raised to the stowed position, the trailing axle 70 and wheels 72 fall against the lift arms 34, but are above and behind or rearward of the cargo body 16. Also, the hydraulic drive 26 and the lift arms 34 and 35 are at the opposite lateral ends of the cargo body 16. As a result, the opening at the rear end of the cargo body 16 with the tailgate 20 open is not obstructed in any way so that the load in the cargo body 16 is able to flow freely out of the cargo body 16 and to the ground. The flow of the load out of the cargo body 16 to the ground is facilitated by tilting the front end of the cargo body 16 with a telescopic dump cylinder 22, as shown in FIG. 9.

The trailing axle 70 and the wheels 72 are in the storage position, corresponding to the final position described above and shown in FIGS. 4B and 5C. In this position, the trailing axle 70 and the wheels 72 have fallen down against the lift arms 34 and 35. In the position shown in FIGS. 4B and 5C, the height of the trailing axle 70 and the wheels 72 above the cargo body 16 is minimized as a result of the trailing axle 70 disposed in the retracted orientation. In this way, the trailing axle assembly 24 of this invention is able to met governmental regulations. When the trailing axle assembly 24 is in this position, it does not interfere with the dumping of the load into the road equipment.

To position the axle so that the wheels 72 return to the ground, or the operative position, the hydraulic drive 26 is operated to extend the cylinder rods 30 from the lift cylinders 28A. As the cylinder rod 30 is extended from the lift cylinders 28A, the hydraulic drive 26 and lift arms 34 and 35 lower in descending pivotal traverse. Air is put into the rod end of air cylinder 90, forcing the air cylinder to retract. The force of the air cylinder pushes the center of gravity of the support assembly 78, trailing axle 70 and wheels 72 past the normal pendulum position directly below the pivot pin 62. Even if the air cylinder 90 or alternatively a spring offset has not pushed the support assembly 78 to the position where the side members 68 contact the stops 38, when the trailing axle wheels 72 contact the ground, the force of the ground on the tailing axle wheels 72 produces a moment on the support assembly 78 about pivot pin 62 forcing the support assembly 78 against the stops 38.

With the wheels 72 contacting the ground, the vehicle 10 is able to travel along the road. As the vehicle 10 travels along the road, it may encounter bumps rising from the road and dips (e.g., potholes) extending into the road. The invention compensates for these bumps and dips. As shown in FIG. 3, when the cylinder rod 30 is fully extended from the lift cylinders 28A, the trailing axle 70 and wheels 72 are forced on the ground. An air bag suspension system 69 coupled to trailing axle 70 and support assembly 78 operates to advantageously absorb the shock from bumps and dips in the road. Air bag suspension system 69 is well known in the art, details of which will readily occur to the skilled artisan. As a result, the specific structural features of air bag suspension system will not be herein specifically addressed. By virtue of the air bag suspension system 69, the trailing axle 70 and the wheels 72, in their movement, are able to compensate for bumps and dips in the road. This provides for a smooth movement of the vehicle 10 and the trailing axle assembly 24 while traveling along the road. Furthermore, all of the force absorbed by the air bag suspension system 69 is absorbed directly into stops 38, thereby eliminating any force to be absorbed by air cylinder 90 of which is operative for facilitating the retracted and extended orientation of support assembly 78. With absorption of force by air cylinder 90 eliminated, air cylinder 90 will occasion little or no wear as a result of bumps and dips in the road or other adverse road conditions trailing axle assembly 24 may experience over an extended period of time.

Figure 7:
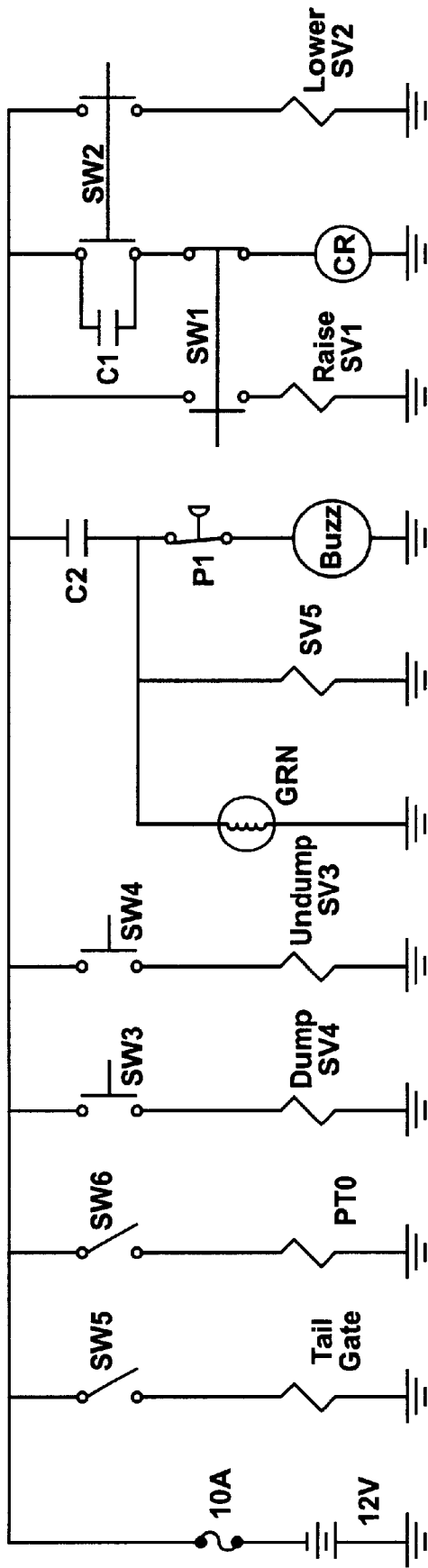
FIG. 7 is a schematic diagram of the electrical circuitry used in conjunction with the trailing axle assembly of FIG. 1 to provide movement of the trailing axle assembly between the lowered position and the stowed position.
Figure 8:
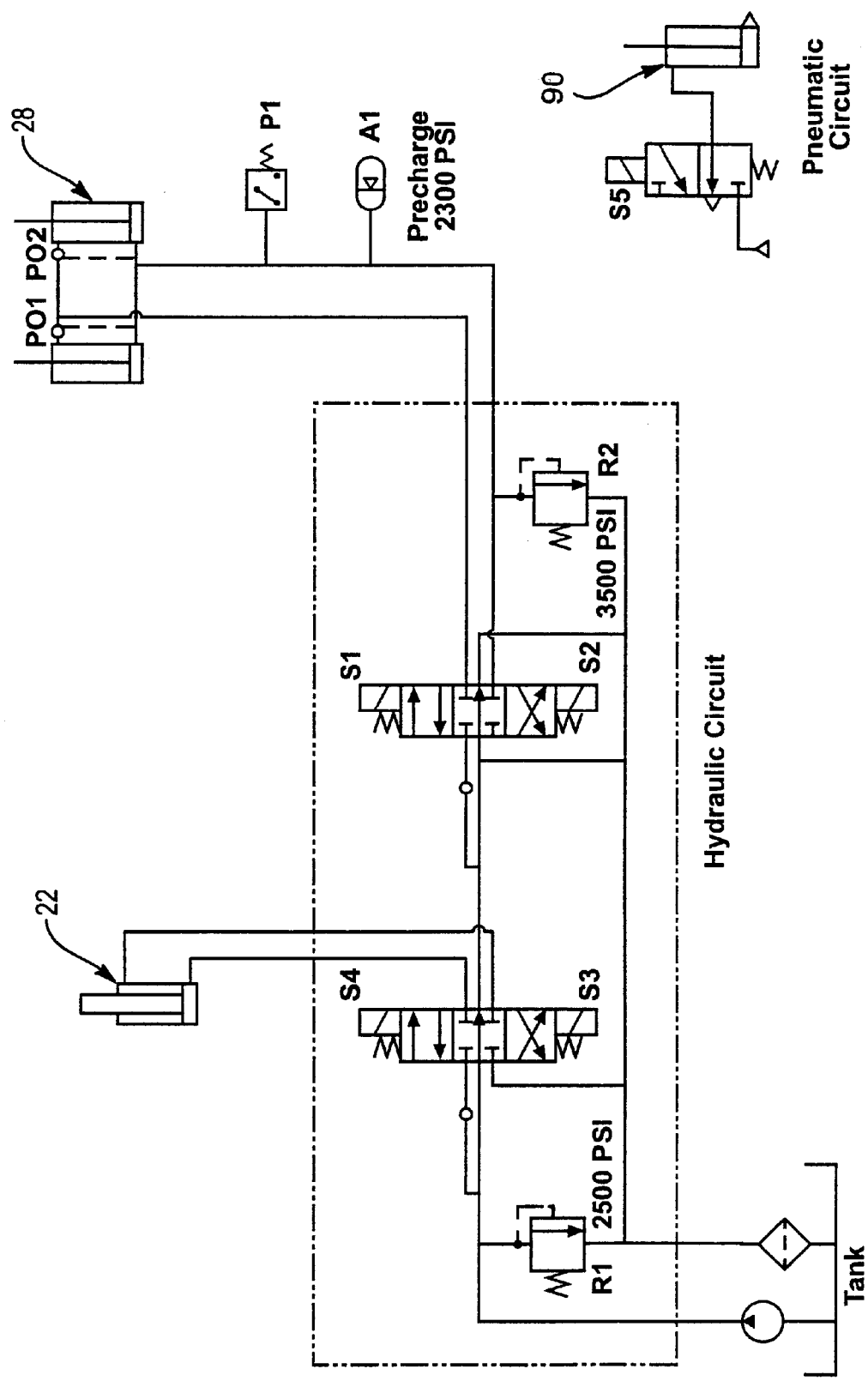
FIG. 8 is a schematic diagram of a hydraulic and pneumatic circuitry which is used in conjunction with the trailing axle assembly shown in FIG. 1 to provide a movement of the trailing axle assembly between the operative position and an inoperative position.

Turning to FIG. 7, illustrated is an electrical circuitry for moving the trailing axle assembly 24 between the storage and operative position. FIG. 8 illustrates the hydraulic circuitry which operates in conjunction with the electrical circuitry shown in FIG. 7 to move the trailing axle assembly 24 between the storage and operative positions. The construction and operation of the electrical circuitry shown in FIG. 7 and the hydraulic circuitry shown in FIG. 8 will be described in conjunction.

The circuitry shown in FIG. 7 includes seven switches which are respectively designated as SW1, SW2, SW3, SW4, SW5, SW6 and a pressure switch PS1. These switches may be disposed in a control panel (not shown) in the cab 12 of vehicle 10. SW1 controls the raising of the trailing axle. SW2 controls the lowering of the trailing axle. SW3 controls the raising of the telescopic dump cylinder 22. SW4 controls the lowering of the telescopic dump cylinder 22. SW5 controls the tailgate lock (not shown). SW6 controls the power take-off, which turns on the pump to begin the flow of hydraulic fluid.

This ensuing discussion begins with the trailing axle assembly 24 in the inoperative, stowed or storage position and the cargo body 16 in the lowered position. To lower the trailing axle assembly 24 from the storage position, the operator activates momentary switch SW2. This also energizes the relay coil CR and solenoid S2. In FIG. 8, the activation of S2 shifts the valve such that hydraulic fluid flows from the pump to the head end of the lift cylinders 28A. Pressure in the head end side of the lift cylinders open the pilot operated check valves PO1 and PO2 and allow the fluid from the rod end of the lift cylinders 28A to flow back to the tank. In FIG. 7, energizing the relay coil CR causes both of the normally open relay contacts C1 and C2 to close. Current flows through contacts C1. This keeps the relay coil CR energized even if the operator deactivates momentary switch SW2. Current also flows through contacts C2. This energizes the buzzer, a light L1 and S5. In FIG. 7, when S5 is energized the pneumatic valve opens allowing air to flow into air cylinder 90. This forces the axle past its center (gravity actuated) position so that as the axle contacts the ground it will come into its operating position. Alternatively, this urging the axle past its center position may also be accomplished by other methods such as spring offsetting the axle. In FIG. 7, the current flows through contacts C2 which turns on a light in the cab telling the operator that he is in the operating position. Until the pressure builds up in the lift cylinders 28A, the buzzer will continue to buzz and the light will stay on even if the operator ceases to push switch 2. If the operator continues to push switch 2, the axle will eventually contact the ground, the pressure in the head end of the lift cylinders 28A will build up, the accumulator A1 will have been charged and the pressure switch P1 will open. When the pressure switch P1 opens the buzzer deactivates, but the light L1 still stays on. This tells the operator that the axle is in the operating position and that it has sufficient pressure down on the road. Should the pressure in the lift cylinders drop below optimal operating pressure for any reason, the buzzer in the cab comes back on informing the operator that the trailing axle 70 needs to be pressured down.

In the operating position, most of the road shock is taken by the air bag suspension 69 and the lift cylinders do not move. Should the vehicle 10 go over a large bump, the axle maximizes the movement of the air bag suspension 69 but still needs to move farther. If the force on the trailing axle 70 is high enough the lift cylinders 28A are forced to contract. Referring to FIG. 8, the oil from the head end of the cylinder flows into the accumulator A1. When the force on the trailing axle 70 decreases, the oil from the accumulator A1 flows back into the head end of the lift cylinders 28A and once again the airbags take over the task of handling the road shock. On some occasions, the force on the axle may maximize both the air bag suspension 69 and the accumulator A1. In these situations, oil from the head end of the lift cylinders can flow through the port relief R2 and back to the tank. When the force on the axle is reduced, the lift cylinders 28A will not be restored to its previous position and the pressure in the head end of the lift cylinders 28A will be reduced. Pressure switch P1 will sense this and in FIG. 7, the contacts of P1 will close, activating the buzzer.

To raise the trailing axle 70 from the operative position to the storage position, the operator activates SW1. This energizes solenoid S1 and deenergizes the relay coil CR. With the relay coil deenergized, contacts C1 and C2 open. The buzzer and S5 also deenergize. In FIG. 8, with S5 deenergized the air valve deactivates and the air pressure in air cylinder 90 vents to atmosphere. With S1 energized, fluid flows from the pump through the pilot operated check valves PO1 and PO2 into the rod end of lift cylinders 28A forcing the cylinder rods 30 to retract into the lift cylinders 28A back to tank. In this position, the fluid is locked in the rod end of both lift cylinders 28A by pilot operated check valves PO1 and PO2. This safely locks the trailing axle assembly 24 in the stowed position. The operator may energize switch SW5 which unlatches the tailgate.

When the operator energizes momentary switch SW3 current flows to energize solenoid S4. In FIG. 8, when S4 energizes the valve shifts to allow fluid from the pump to flow to the head end of the telescopic dump cylinder 22 which extends the rod and raises the body. The fluid from the rod end returns to the tank. When the operator energizes momentary switch SW4, current flows to energize solenoid S3. In FIG. 8, when S3 energizes the valve shifts to allow fluid to flow from the pump to the rod end of the telescopic dump cylinder 22 and fluid from the head end of the telescopic dump cylinder 22 returns to the tank and the body lowers. The operator may deenergize SW5 to latch the tailgate.

At the end of any hydraulic cylinder movement, when the cylinder comes to the end of its stroke, oil from the pump flows over the main relief valve R1 and back to tank.

The present invention utilizes an air bag suspension system 69 rather than the conventional use of an accumulator and cylinders acting as the suspension system for the trailing axle assembly 24. The air bag suspension system 69 compensates for the regular bumps and dips encountered while traveling along the road. This eliminates the need for many parts to do the task of one, the air bag suspension system 69. When the air bag suspension system 69 exceeds its capacity with slower, larger undulations, such as a railroad crossing, the lift cylinders 28A fill and the accumulator 48 begins to act as the suspension system for the trailing axle assembly 24.

The trailing axle assembly 24 provides for attachment to the side panels 18 of vehicle 10 without bowing the frame 14 away from the cargo body 16. Trailing axle assembly 24 further provides for the full use of the distance between the rear wheels 17 of vehicle 10 and the wheels 72 in the trailing axle assembly 24 in distributing the weight of the load in the cargo body 16 between the front wheels 13 on the vehicle 10 and the wheels 72. Trailing axle assembly 24 still further provides for a smooth and efficient movement of the trailing axle assembly 24 over bumps and dips in the road when the trailing axle assembly 24 is in the operative position with the wheels 72 on the road and when the vehicle 10 is traveling along the road. When the wheels 72 move over bumps or into dips in the road, the changes in force are limited because of the large reservoir provided by the accumulator 48. This tends to assure long life in the operation of the trailing axle assembly 24.

The trailing axle assembly 24 minimizes the height of the trailing axle assembly 24 above the ground when the trailing axle assembly 24 is in the storage position. Trailing axle assembly 24 further provides for the dumping of the load in the cargo body 16 without any obstructions from the trailing axle assembly 24 when the trailing axle assembly is in the storage position. The trailing axle assembly 24 is also advantageous because it can balance uneven loads on the opposite lateral sides of the cargo body 16 when the trailing axle assembly 24 is moved between the storage position shown in FIGS. 4A and 5A and the operative position on the ground. This results from the balancing action of the gas in the accumulator 48.

The present invention has been described above with reference to a preferred embodiment. However, those skilled in the art will recognize that changes and modifications may be made in the described embodiments without departing from the nature and scope of the present invention. For instance, trailing axle assembly 24 may alternatively be coupled to a trailer for attachment to a towing vehicle if desired. Nevertheless, various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

What is claimed is:

1. An apparatus for attaching an auxiliary axle to a vehicle having longitudinal, lateral, and transverse directions, the apparatus comprising:

a first lift arm secured to a vehicle to pivot between a raised position and a lowered position extending from a proximal end, proximate the vehicle, longitudinally away from the vehicle toward a distal end providing support to the vehicle;

an actuator, pivotably connected between the first lift arm and the vehicle to position the lift arm between the raised and lowered positions; and an axle assembly connected to the first lift arm to be pivotable between a stowed position, proximate the vehicle and longitudinally behind the distal end of the first lift arm in the raised position, and a deployed position behind the distal end of the first lift arm in the lowered position.

2. The apparatus of claim 1, wherein the axle assembly is configured to maintain a height below a government-restricted maximum height in the stowed position.

3. The apparatus of claim 1, wherein the axle assembly further comprises a frame, an axle and a suspension system therebetween to provide transverse travel of the axle with respect to the first lift arm.

4. The apparatus of claim 3, wherein the axle, in moving from the deployed position to the stowed position, moves through an acute angle with respect to the first lift arm.

5. The apparatus of claim 3, wherein the suspension system comprises an air bag suspension system.

6. The apparatus of claim 3, wherein the suspension system comprises a spring suspension system.

7. The apparatus of claim 1, wherein the actuator is configured to provide a comparatively large deflection of the axle assembly with respect to the vehicle.

8. The apparatus of claim 1, wherein the actuator is configured to provide a comparatively low frequency response to variations in road conditions.

9. The apparatus of claim 1, further comprising a suspension system.

10. The apparatus of claim 9, wherein the suspension system is configured to provide a comparatively high frequency response to variations in road conditions.

11. The apparatus of claim 1, further comprising a second lift arm and another actuator corresponding to the first lift arm and other actuator, and connected thereto by a crossbeam fixed to extend laterally between the distal ends of the first lift arm and the second lift arm.

12. The apparatus of claim 11, wherein the actuator and other actuator comprise hydraulic pistons.

13. An apparatus for attaching an auxiliary axle to a vehicle having longitudinal, lateral, and transverse directions, the apparatus comprising:

- a first lift arm secured to a vehicle to pivot between a raised position and a lowered position extending from a proximal end, proximate the vehicle, longitudinally away from the vehicle toward a distal end providing support to the vehicle;
- an actuator, pivotably connected between the first lift arm and the vehicle to position the lift arm between the raised and lowered positions;
- an axle assembly connected to the first lift arm to be pivotable between a stowed position and a deployed position; and
- an axle connected to the axle assembly and configured to move monotonically downward with respect to the distal end of the first lift arm through an acute angle between the deployed position and the stowed position.

14. The apparatus of claim 13, wherein the axle assembly is configured to minimize the envelope of the apparatus in the raised position.

15. The apparatus of claim 14, wherein the axle assembly further comprises a frame and a suspension system between the frame and the axle to provide transverse travel of the axle with respect to the first lift arm.

16. The apparatus of claim 15, wherein the axle, in moving from the deployed position to the stowed position, moves through an acute angle with respect to the first lift arm.

17. The apparatus of claim 16, wherein the suspension system comprises an air bag suspension system.

18. The apparatus of claim 16, wherein the suspension system comprises a spring suspension system.

19. The apparatus of claim 17, wherein the actuator is configured to provide a comparatively large deflection of the axle with respect to the vehicle.

20. The apparatus of claim 19, wherein the actuator is configured to provide a comparatively low frequency response to variations in road conditions.

21. The apparatus of claim 20, wherein the suspension system is configured to provide a comparatively high frequency response to variations in road conditions.

22. The apparatus of claim 21, further comprising a second lift arm and another actuator corresponding to the first lift arm and other actuator, and connected thereto by a cross-beam fixed to extend laterally between the distal ends of the first lift arm and the second lift arm.

23. The apparatus of claim 22, wherein the actuator and other actuator comprise hydraulic pistons.

24. An apparatus for attaching an auxiliary axle to a vehicle having longitudinal, lateral, and transverse directions, the apparatus comprising:

- a first lift arm secured to a vehicle to pivot between a raised position and a lowered position extending from a proximal end, proximate the vehicle, longitudinally away from the vehicle toward a distal end providing support to the vehicle;
- an actuator, pivotably connected between the first lift arm and the vehicle to position the lift arm between the raised and lowered positions;
- an axle assembly connected to the first lift arm to be pivotable between a stowed position and a deployed position; and
- an axle connected to the axle assembly and configured to move, with respect to the distal end of the first lift arm, monotonically in the direction of gravitational force thereon in moving from the deployed position to the stowed position.

25. The apparatus of claim 24, wherein the axle assembly is configured to minimize the envelope of the apparatus in the raised position.

26. The apparatus of claim 24, wherein the axle assembly further comprises a frame and a suspension system between the frame and the axle to provide transverse travel of the axle with respect to the first lift arm.

27. The apparatus of claim 24, wherein the axle, in moving from the deployed position to the stowed position, moves through an acute angle with respect to the first lift arm.

28. The apparatus of claim 24, wherein the suspension system comprises an air bag suspension system.

29. The apparatus of claim 24, wherein the suspension system comprises a spring suspension system.

30. The apparatus of claim 24, wherein the actuator is configured to provide a comparatively large deflection of the axle with respect to the vehicle.

31. The apparatus of claim 24, wherein the actuator is configured to provide a comparatively low frequency response to variations in road conditions.

32. The apparatus of claim 26, wherein the suspension system is configured to provide a comparatively high frequency response to variations in road conditions.

33. The apparatus of claim 24, further comprising a second lift arm and another actuator corresponding to the first lift arm and other actuator, and connected thereto by a cross-beam fixed to extend laterally between the distal ends of the first lift arm and the second lift arm.

* * * * *

UNITED STATES PATENT AND TRADEMARK OFFICE
CERTIFICATE OF CORRECTION

PATENT NO. : 6,247,712 B1      Page 1 of 1
DATED : June 19, 2001
INVENTOR(S) : Fred P. Smith et al.

It is certified that error appears in the above-identified patent and that said Letters Patent is hereby corrected as shown below:

<u>Title page,</u>
Item [76], add: WILBUR DEJONG as an inventor

Signed and Sealed this

Twelfth Day of February, 2002

*Attest:*

JAMES E. ROGAN
*Attesting Officer*      *Director of the United States Patent and Trademark Office*